3,050,363
REMOVAL OF NITRIC OXIDE FROM GAS STREAMS
Dean J. Veal, Bartlesville, Okla., assignor to Phillips Petroleum Company, a corporation of Delaware
No Drawing. Filed July 28, 1958, Ser. No. 751,186
4 Claims. (Cl. 23—157)

This invention relates to a process for the removal of nitric oxide from a gas stream. In a more specific aspect the invention relates to a process for the catalytic conversion of nitric oxide in a gas stream to nitrogen dioxide and the removal of the nitrogen dioxide from the gas stream in a single contacting step.

Many commercial processes, including the polymerization of ethylene to form solid polymers, require the use of blanketing gases at various points in the process which are relatively inert. A number of methods have previously been employed to remove nitric oxide from gas streams, especially to prepare such relatively inert blanketing gases. One economical blanketing gas can be commercially produced by the combustion in air of natural gas or other hydrocarbons from which the sulfur-containing impurities have been removed. In this process it is attempted to employ only enough of the combustible hydrocarbon to convert substantially all of the oxygen to carbon dioxide and water. The resulting gas contains traces of oxygen, carbon monoxide, nitric oxide and gaseous hydrocarbons of the methane series, in addition to the desired inert nitrogen and carbon dioxide and the water produced in the combustion.

Prior art processes for the removal of nitric oxide include both wet and dry processes. In a typical wet process, removal of the nitric oxide is accomplished by contact with an aqueous chromous salt solution. Such processes are inherently relatively cumbersome and expensive. In various dry processes, the nitric oxide is merely adsorbed from the gas by an adsorbent such as silica gel or activated carbon. Such processes are relatively ineffective as far as completeness of removal is concerned, particularly in the presence of carbon dioxide.

It has also been proposed to react the nitric oxide with the residual oxygen in the gas to produce nitrogen dioxide since nitrogen dioxide is more readily removed from the blanketing gases. However, the rate at which nitric oxide is oxidized by oxygen is dependent upon the square of the oxygen concentration in the combustion gases. Therefore, the conversion at high temperature and the low concentrations usually encountered is extremely slow. In some current processes for the preparation of blanketing gases, silica gel is employed at ambient temperatures for the purpose of drying the gas, but it does not adsorb the nitric oxide. Downstream from the drying step there is present nitric oxide in considerable proportion, although some of the nitric oxide reacts with residual air while in contact with the silica gel to form nitrogen dioxide, which is largely removed by the silica gel. However, the disadvantage of this process is that a large proportion of the nitric oxide is left in the gaseous stream. This nitric oxide is deleterious in the blanketing gas in many chemical processes.

It is therefore an object of the invention to provide an improved process for the removal of nitric oxide from gas streams. Other objects, as well as aspects and advantages of the invention, will become apparent from a study of the accompanying disclosure.

According to the invention a gas containing minor proportions of nitric oxide is oxidized to nitrogen dioxide by contacting the gas in the presence of oxygen with an adsorbent catalyst and in the same step of contacting at least a major portion of the nitrogen dioxide is removed by the adsorbent catalyst from the gas.

In addition to the gas previously discussed, resulting from burning natural gas or other hydrocarbons with air, other gases containing nitric oxide can be treated according to the invention, such as coke oven gases, cracked natural gases, oil gas and similar technical gas mixtures, including hydrocarbon gases predominantly of the methane series. In most of the gases feeds there is enough oxygen present to effect the conversion of nitric oxide to nitrogen dioxide. However, if the oxygen is not present it can be added to the feed in appropriate amounts in the form of air or oxygen.

As the adsorbent catalyst there is employed an anhydride of an inorganic acid having an oxidation potential of at least 1.25 volts at 25° C., referred to the hydrogen couple as zero, deposited on a porous adsorbent carrier. Usually the carrier has a surface area of at least 50 square meters per gram. Preferably, the anhydride employed is non-volatile.

Particularly effective acid anhydrides are iodine pentoxide and chromium trioxide.

The acid anhydrides are present on the carrier in minor proportion, usually in the range from 1 to 10 percent by weight of the total catalyst, although amounts below and above this range are applicable. The porous support can be, for instance, silica gel, silica-alumina, activated alumina including gamma alumina and eta alumina, and activated carbon.

The process of the invention is effected by contacting the gas at a temperature in the range from −70 to +60° C., usually from 0 to 30° C. Temperatures in the range from 0 to 15° C. are most often used because the lower temperatures favor the conversion to nitrogen dioxide. Temperatures below 0° C. are quite applicable but as a practical matter are usually not preferred since earlier plugging of the catalyst bed tends to result simply because of freezing of water in the system.

In the following examples, silica gel is compared with two of the adsorbent catalyst of the invention. These two catalysts were made in the following manner:

Chromium trioxide-silica gel catalyst. Ten parts by weight of chromium trioxide were dissolved in 45 parts by weight of 95% sulfuric acid. This solution was agitated and 100 parts of water was slowly added thereto with continued agitation, and 100 parts by weight of 28-mesh silica gel was then added. The solution was allowed to settle and the excess solution was drawn off through the silica gel by application of vacuum to an exit line located beneath the silica gel bed. Thereafter, the water was removed by heating the catalyst to 120° C. and maintaining this temperature for about 4 hours under a vacuum of about 26 inches of mercury (1.9 p.s.i.a.).

Iodine pentoxide-silica gel catalyst. This catalyst was prepared in a manner similar to the chromium trioxide catalyst except that 7.5 parts by weight of iodine pentoxide was dissolved in 55 parts by weight of water, instead of dissolving chromium trioxide in sulfuric acid. To the solution was added 75 parts by weight of silica gel. Excess solution was again drawn off and the catalyst was then heated to 220° C. and held at this temperature for 5 hours to dry the catalyst.

Comparative tests were run with silica gel and with each of the two foregoing catalysts employing as the gas to be treated a gas of the following composition, as shown in Table I below.

*Table I*

| Constituent: | Analyzed, mole percent |
|---|---|
| $N_2$ | 88.23 |
| $CO_2$ | 11.7 |
| $O_2$ | p.p.m__ 480 |
| $H_2O$ | p.p.m__ 96 |
| NO | p.p.m__ 100 |
| $NO_2$ | p.p.m__ 8.2 |

The results of passing this gas through the various catalyst systems are shown in Table II. The catalysts were supported in fixed beds in jacketed tubes through which cooling medium was passed to aid in maintaining the reaction temperatures given in each of the runs, as shown in Table II.

*Table II*

| Run No. | Type of Catalyst | Reaction Temp., °C. | Condition of gas | Cumulative Vol. Gas Passed Thru Catalyst | Nitrogen Dioxide Not Removed | | Nitric Oxide Not Removed From Gas By Catalyst | |
|---|---|---|---|---|---|---|---|---|
| | | | | | Percent of Total | p.p.m. | Percent of Total | p.p.m. |
| 1 | Silica Gel | 4 | wet | 21 | 1.8 | 0.15 | 54 | 54 |
| | | | | 23 | 2.1 | 0.17 | 46 | 46 |
| | | | | 37 | 1.7 | 0.14 | 51 | 51 |
| | | | | Av. | 1.9 | 0.16 | 50 | 50 |
| 2 | do | 4 | dry | 15 | 1.1 | 0.09 | 45 | 45 |
| | | | | 19 | 1.1 | 0.09 | 42 | 42 |
| | | | | 27 | 1.1 | 0.09 | 42 | 42 |
| | | | | Av. | 1.1 | 0.09 | 43 | 43 |
| 3 | Silica Gel + $I_2O_5$ | 24 | wet | 168 | 112 | 10 | 1.6 | 1.6 |
| | | | | 172 | 113 | 11 | 0.76 | 0.7 |
| | | | | 180 | 115 | 12 | 1.3 | 1.3 |
| | | | | Av. | 113 | 11 | 1.2 | 1.2 |
| 4 | do | 5 | wet | 112 | 1.2 | 0.10 | 0.06 | 0.06 |
| | | | | 115 | 1.3 | 0.11 | 0.09 | 0.09 |
| | | | | 118 | 0.8 | 0.06 | 0.07 | 0.07 |
| | | | | Av. | 1.1 | 0.09 | 0.07 | 0.07 |
| 5 | do | 5 | dry | 40 | 0.5 | 0.04 | 0.08 | 0.08 |
| | | | | 44 | 0.2 | 0.02 | 0.06 | 0.06 |
| | | | | 48 | 0.1 | 0.01 | 0.10 | 0.10 |
| | | | | Av. | 0.3 | 0.02 | 0.08 | 0.08 |
| 6 | Silica Gel + $CrO_2$, 20 mesh. | 5 | wet | 31 | 0.9 | 0.07 | 0.04 | 0.04 |
| | | | | 33 | 0.05 | 0.04 | 0.03 | 0.03 |
| | | | | 37 | 0.1 | 0.01 | 0.01 | 0.01 |
| | | | | Av. | 0.5 | 0.04 | 0.03 | 0.03 |

The foregoing examples show the almost complete removal of nitric oxide which can be obtained by means of the catalysts of the invention. It is also seen that the feed can be either substantially dry or it can be wet. Of course, if the feed contains large amounts of water the silica gel will be effective to remove nitric oxide only for a comparatively short time, as will be understood in the art. In the tests in which it is indicated that the feed is substantially dry, the feed of Table I was dried to remove most of the 96 parts per million of water before feeding to the process.

The foregoing tests also show that it is advantageous, from a standpoint of the completeness of conversion of the nitric oxide to nitrogen dioxide and especially from the standpoint of removal of the nitrogen dioxide by the adsorbent catalyst, to maintain a low temperature. Thus, in run No. 3, it will be seen that, although less than 1 or 2 percent of the original nitric oxide is left in the gas at 24° C., only around 90 mole percent of the original nitrogen dioxide plus the nitrogen dioxide obtained from conversion of nitric oxide was removed at this temperature. Of course, as will be understood, relatively larger amounts of adsorbent catalyst and longer contact times can be used in order to further drive the reaction to completion and to further lower the amount of residual nitrogen dioxide in the gas. Nevertheless, the foregoing data show that it is very advantageous to maintain a low temperature, and, as stated, temperatures of 15° C. and below are preferred.

As will be evident to those skilled in the art, various modifications of this invention can be made or followed in the light of the foregoing disclosure and discussion without departing from the spirit or scope of the disclosure or from the scope of the claims.

I claim:

1. A one-step process for the oxidation of nitric oxide in a gas stream containing the same in minor proportions and also containing oxygen, and the simultaneous removal of resulting nitrogen dioxide from said gas stream, which comprises contacting said gas stream at a temperature of −70 to +60° C. with a catalyst comprising iodine pentoxide deposited on a porous support having a surface area of at least 50 square meters per gram, simultaneously adsorbing the resulting nitrogen dioxide by said catalyst, and separating a substantially nitrogen dioxide-free gas stream from said catalyst.

2. The process of claim 1 wherein said porous support is selected from the group consisting of silica gel, silica alumina, activated alumina and activated carbon.

3. A process of claim 1 wherein the said contacting is effected at a temperature in the range from 0 to 30° C.

4. A process of claim 2 wherein said support is silica gel.

References Cited in the file of this patent

UNITED STATES PATENTS

| 1,391,332 | McKee | Sept. 20, 1921 |
| 1,443,220 | Guye | Jan. 23, 1923 |
| 1,520,437 | Pipkin | Dec. 23, 1924 |
| 2,674,338 | Lindsay | Apr. 6, 1954 |
| 2,800,392 | Pike | July 23, 1957 |

FOREIGN PATENTS

| 135,345 | Australia | May 15, 1947 |
| 662,460 | Great Britain | Dec. 5, 1951 |

OTHER REFERENCES

Mellor's Comp. Treatise on Inorg. and Theo. Chem., p. 872, Supp. II, Part I, Longmans, Green and Co., N.Y., 1956.